(12) United States Patent
Madaiah et al.

(10) Patent No.: US 10,305,855 B2
(45) Date of Patent: May 28, 2019

(54) SYSTEM AND METHOD FOR CONNECTING NETWORK ENTITIES IN A BROADBAND COMMUNICATION NETWORK WITHOUT CIRCUIT-SWITCHED FALLBACK

(71) Applicant: TEJAS NETWORKS LIMITED, Bangalore (IN)

(72) Inventors: Vinod Kumar Madaiah, Karnataka (IN); Anuchuru Sudheer Kumar, Andhra Pradesh (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 205 days.

(21) Appl. No.: 15/418,140

(22) Filed: Jan. 27, 2017

(65) Prior Publication Data

US 2017/0215216 A1 Jul. 27, 2017

(30) Foreign Application Priority Data

Jan. 27, 2016 (IN) .............................. 201641002957

(51) Int. Cl.
*H04L 12/46* (2006.01)
*H04L 29/12* (2006.01)
*H04W 76/12* (2018.01)

(52) U.S. Cl.
CPC ...... *H04L 61/2007* (2013.01); *H04L 12/4633* (2013.01); *H04W 76/12* (2018.02)

(58) Field of Classification Search
CPC ............................ H04W 45/306; H04W 40/02

USPC .................. 370/328–339; 455/404.1, 436
See application file for complete search history.

(56) References Cited

U.S. PATENT DOCUMENTS

| | | | |
|---|---|---|---|
| 9,749,904 B1* | 8/2017 | Zhang | H04W 36/0022 |
| 10,079,860 B2* | 9/2018 | Keller | H04L 65/1016 |
| 2015/0163041 A1* | 6/2015 | Kodali | H04L 1/1812 |
| | | | 370/252 |

* cited by examiner

*Primary Examiner* — Iqbal Zaidi
(74) *Attorney, Agent, or Firm* — Oliff PLC (57) ABSTRACT

The present disclosure relates to field of telecommunication that provides method and system for connecting network entities in broadband communication network without Circuit-Switched fallback. Primary network entity sends a request to local network controller that ensures interoperability and reduces delay in setting up voice/data connection. The local network controller forwards the request to the central network controller that identifies the destination intermediate network entity. If the destination intermediate network entity is present in the same network as the source intermediate network entity, the central network controller assigns an IP address and establishes a traffic engineered tunnel which in turn establishes the voice calls/data connection between the primary and the secondary network entity. Otherwise, the voice calls/data connection is forwarded to a Remote Anchoring Gateway. The present disclosure reduces congestion as the request reaches Remote Anchoring Gateway only when the source and the destination intermediate network entities are in different networks.

15 Claims, 4 Drawing Sheets

SYSTEM AND METHOD FOR CONNECTING NETWORK ENTITIES IN A BROADBAND COMMUNICATION NETWORK WITHOUT CIRCUIT-SWITCHED FALLBACK

TECHNICAL FIELD

The present disclosure generally relates to field of telecommunication. Particularly, but not exclusively, the present disclosure relates to a system and a method for connecting network entities in a broadband communication network without Circuit-Switched (CS) fallback.

BACKGROUND

Generally, people use voice calls/data connection to a major extent as a way of communicating with other people. People rely on different kinds of User Equipment (UE) to establish connection for voice calls/data connection using different network operators. The generated voice calls/data connection may be between. UE's belonging to different network operators or UE's belonging to same network operators.

Existing techniques establish connection for voice calls/data connection, by initially sending a request from the UE for initialising voice calls/data connection to Evolved Node B (eNodeB). Evolved Node B (eNodeB) is a hardware that is connected to the mobile phone network that communicates directly with mobile handsets (UEs) like a Base Transceiver Station (BTS) in GSM networks. The eNodeB then forwards the request to a Mobility Management Entity (MME). The MME is a key component of the standards-defined Evolved Packet Core (EPC) for Long Term Evolution (LTE) network. The MME may provide mobility session management for the LTE network and supports subscriber authentication, roaming and handovers to other networks. Thereafter, the MME forwards the request to Serving Gateway/Packet data network Gateway (SGW/PGW) for setting up a connection between the eNodeB and SGW/PGW. The method of establishing connection for voice calls/data connection between two UEs is same irrespective of whether the UEs belong to the same network operator or different network operators. Therefore, anchoring the connection at the SGW/PGW for UEs belonging to same network as well as different networks causes high traffic on MME/SGW/PGW. The high traffic leads to delay in establishing connections or sometimes leads to congestion at the MME/SGW/PGW.

In the existing techniques, for establishing voice calls/data connection, the UE has to fall back to second-generation (2G). The main reason for the fall back is that LTE network does not have any procedure to setup connection of the voice calls/data connection over LTE network without assigning Internet Protocol (IP) address to the UE. The LTE network is designed based on IP network architecture which may not allow operator to setup a connection for voice calls/data connection between two UEs without assigning IP address. Further, this IP address is a private IP address known only to the MME and not to each UE in order to communicate directly without any help of the IP Multimedia Subsystem (IMS) or PGW. Therefore we need a mechanism for two UEs to communicate directly without CS-fallback.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a network controlling system for connecting network entities in a broadband communication network without Circuit-Switched (CS) fallback. The network controlling system comprises a local network controller configured to receive a Radio Resource Control (RRC) request from a source intermediate network entity for initiating at least one of a voice connection or a data connection with a secondary network entity. The source intermediate network entity receives the RRC request from a primary network entity. Further, the local network controller transmits the RRC request to a central network controller. Furthermore, the central network controller receives the RRC request from the local network controller and identifies a destination intermediate network entity associated with the secondary network entity based on the RRC request. Also, the central network controller identifies a broadband communication network corresponding to the destination intermediate network entity. The central network controller assigns an Internet Protocol (IP) address and establish a traffic engineered tunnel between the source intermediate network entity and the destination intermediate network entity, if the source intermediate network entity and the destination intermediate network entity are present in same broadband communication network, thereby establishing at least one of the voice connection or the data connection without CS fallback.

Further, the present disclosure provides a method for connecting network entities in a broadband communication network without Circuit-Switched (CS) fallback. The method comprises receiving, by a local network controller configured in the system, a Radio Resource Control (RRC) request from a source intermediate network entity for initiating at least one of a voice connection or a data connection with a secondary network entity. The source intermediate network entity receives the RRC request from a primary network entity. Further, the local network controller transmits the RRC request to a central network controller. Furthermore, the central network controller receives the RRC request from the local network controller and identifies a destination intermediate network entity associated with the secondary network entity based on the RRC request. Also, the central network controller identifies a broadband communication network corresponding to the destination intermediate network entity. The central network controller assigns an Internet Protocol (IP) address and establish a traffic engineered tunnel between the source intermediate network entity and the destination intermediate network entity, if the source intermediate network entity and the destination intermediate network entity are present in same broadband communication network, thereby establishing at least one of the voice connection or the data connection without CS fallback.

BRIEF DESCRIPTION OF THE DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present invention provides a system and a method for connecting network entities in a broadband communication network without Circuit-Switched (CS) tailback. A primary network entity sends a request to source intermediate network entity to establish a voice call/data connection with a secondary network entity. The source intermediate network entity forwards the request to a local network controller using S1-Application Protocol (S1-AP) interface. The local network controller further sends the request to the central network controller using S10 interface that identifies the destination intermediate network entity of the secondary network entity. The S10 acts as a control interface between the central network controller and the local network controller. If the destination intermediate network entity is present in the same network as the source intermediate network entity, the central network controller assigns an Internet Protocol (IP) address and establishes a traffic engineered tunnel between the source intermediate network entity and the destination intermediate network entity. The traffic engineered tunnel between the source intermediate network entity and the destination intermediate network entity in turn establishes the voice calls/data connection between the primary network entity and the secondary network entity. If the destination intermediate network entity is not present in the same network as the source intermediate network entity, the central network controller forwards the voice calls/data connection to a remote anchoring gateway. The traffic engineered tunnel between the source intermediate network entity and the destination eNodeB in turn establishes the voice calls/data connection between the primary network entities and the secondary network entities without the interference of remote anchoring gateway. Therefore, load on the remote anchoring gateway decreases, thus reducing the delay in connection establishment and possibility of congestion at the remote anchoring gateway. The traffic engineered tunnel provides guaranteed bit rate for the voice calls. On the other hand, the traffic engineered tunnel provides best effort or average bit rate for the data connection. Further, the present disclosure provides a method wherein CS fall back is avoided which in turn reduces cost of the network entities and the broadband communication network.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
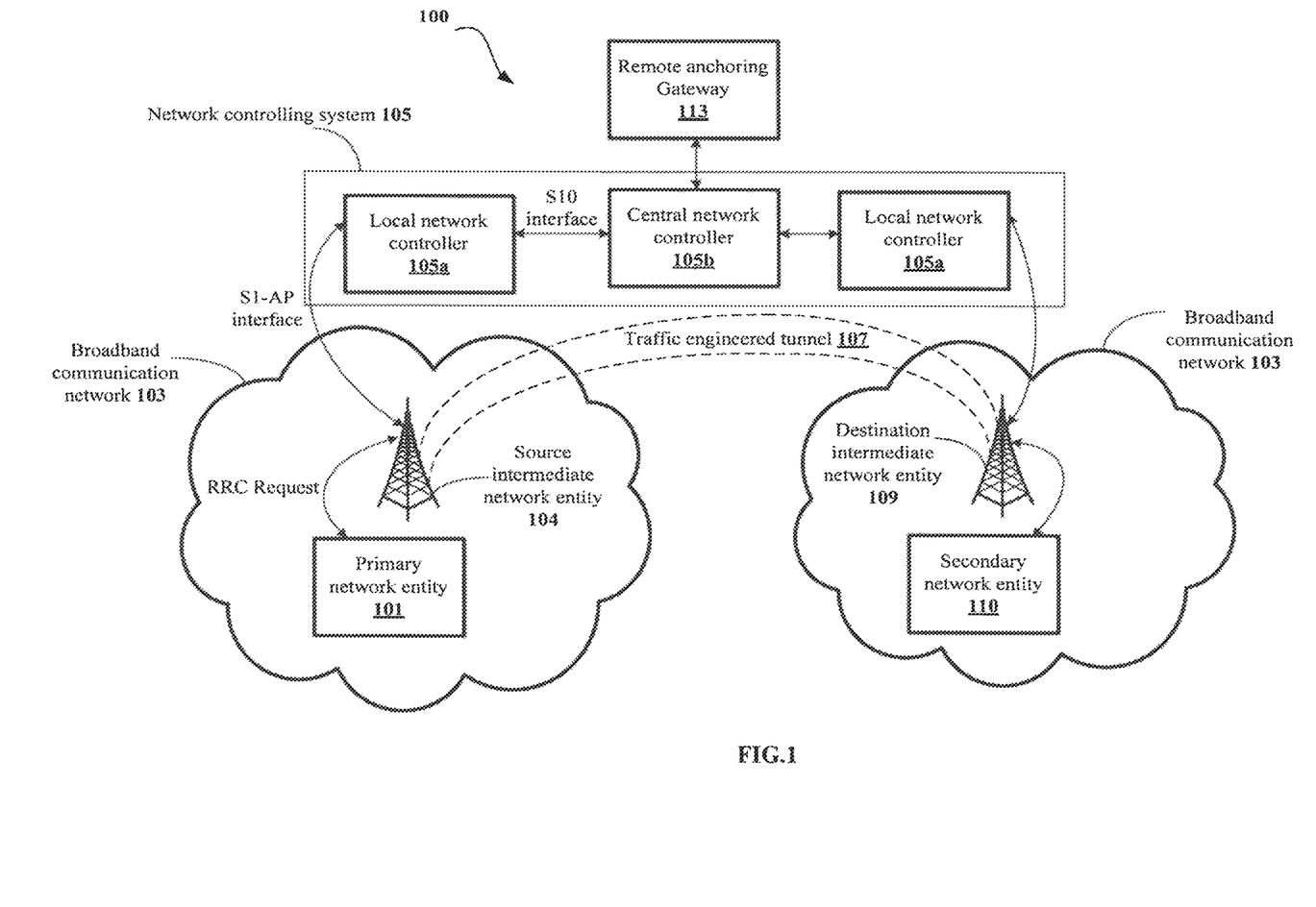
FIG. 1 shows an exemplary architecture of the system for connecting network entities in a broadband communication network without Circuit-Switched (CS) fallback in accordance with some embodiments of the present disclosure.

FIG. 1 shows an exemplary representation of the system for connecting network entities in a broadband communication network without Circuit-Switched (CS) fallback in accordance with some embodiments of the present disclosure.

The architecture 100 comprises network entities such as a primary network entity 101, a source intermediate network entity 104, a destination intermediate network entity 109 and a secondary network entity 110, a broadband communication network 103, a traffic engineered tunnel 107, a network controlling system 105 and a remote anchoring gateway 113. As an example, the network entities may include, but not limited to, a set of NodeB, a set of Evolved NodeB (eNodeB), a set of Base Transceiver Stations (BTS), a set of Customer Premises Equipment (CPE), a set of packet aggregators, a set of frame processing devices, a set of packet processing devices, a set of signal processing devices, User Equipment (UE) and a set of computers. As an example, a broadband communication network 103 may include, but not limited to, broadband mobile network such as Long-Term Evolution (LTE), Code division multiple access (CDMA) etc., broadband provider switching such as carrier Ethernet, broadband provider routing network such as Internet Protocol (IP) network, broadband cross-connect network such as Synchronous Digital Hierarchy (SDH), broadband light-path network such as Coarse Wavelength Division Multiplexing (CWDM). In an embodiment, the network controlling system 105 comprises a local network controller 105a and a central network controller 105b. The local network controller 105a comprises one or more functionalities of the central network controller 105b. As an example, the network controlling system 105 may be Mobility Management Entity (MME), Authentication, Authorization, and Accounting (AAA), Element Management System (EMS) etc. As an example, the remote anchoring gateway 113 may be a Serving Gateway (SGW), a Packet data network Gateway (PGW) etc.

The network entities are present within the broadband communication network 103. In an embodiment, the network entities may be either present in the same broadband communication network 103 or different broadband communication networks 103. The network entities may connect with each other using voice calls/data connection through the broadband communication network 103. The connections may be at least one of point-to-point connection, point-to-multipoint, peer-to-peer and multipoint-to-point. There must be at least one network entity on each of calling/transmitting end and called/receiving end. Consider that the network entities present on calling end/transmitting end are referred to as the primary network entities 101 and the network entities present on called end/receiving end are referred to as the secondary network entities 110. Therefore, the primary network entity 101 establishes the voice calls/data connection with the secondary network entity 110 through the broadband communication network 103. In an embodiment, if the primary network entity 101 and the secondary network entity 110 are present in the same broadband communication network 103, the connection type is referred to as a local connection. The primary network entity 101 sends a request to the network controlling system 105 through an intermediate network entity to establish the voice calls/data connection. As an example, the request may be a Radio Resource Control (RRC) request.

The request is passed to the local network controller 105a through the source intermediate network entity 104 using S1-AP interface. As an example, the source intermediate network entity 104 may be one or more eNodeB. The primary network entity 101 requests to establish the voice calls/data connection with the secondary network entity 110 using at least one of valid International Mobile Subscriber Identity (IMSI), phone number and global unique Identifier (ID). Further, the local network controller 105a associated with the primary network entity 101 forwards the request to the central network controller 105b using S10 interface.

Upon receiving the request, the central network controller 105b identifies the destination intermediate network entity 109 associated with the secondary network entity 110. As an example, the destination intermediate network entity 109 may be one or more eNodeB. If the destination intermediate network entity 109 is present in the same network as the source intermediate network entity 104, the central network controller 105b assigns an Internet Protocol (IP) address and establishes the traffic engineered tunnel 107 between the source intermediate network entity 104 and the destination intermediate network entity 109. The traffic engineered tunnel 107 between the source intermediate network entity 104 and the destination intermediate network entity 109 in turn establishes the voice calls/data connection between the primary network entity 101 and the secondary network entity 110. Upon establishing the voice calls/data connection, the primary network entity 101 and the secondary network entity 110 exchange bits. As an example, the bits can be voice, data, telex, telemetry etc. The traffic engineered tunnel 107 provides guaranteed bit rate for the voice calls. On the other hand, the traffic engineered tunnel 107 provides best effort or average bit rate for the data connection. If the destination intermediate network entity 109 is not present in the same network as the source intermediate network entity 104, the central network controller 105b forwards the voice calls/data connection to the remote anchoring gateway 113.

Figure 2A:
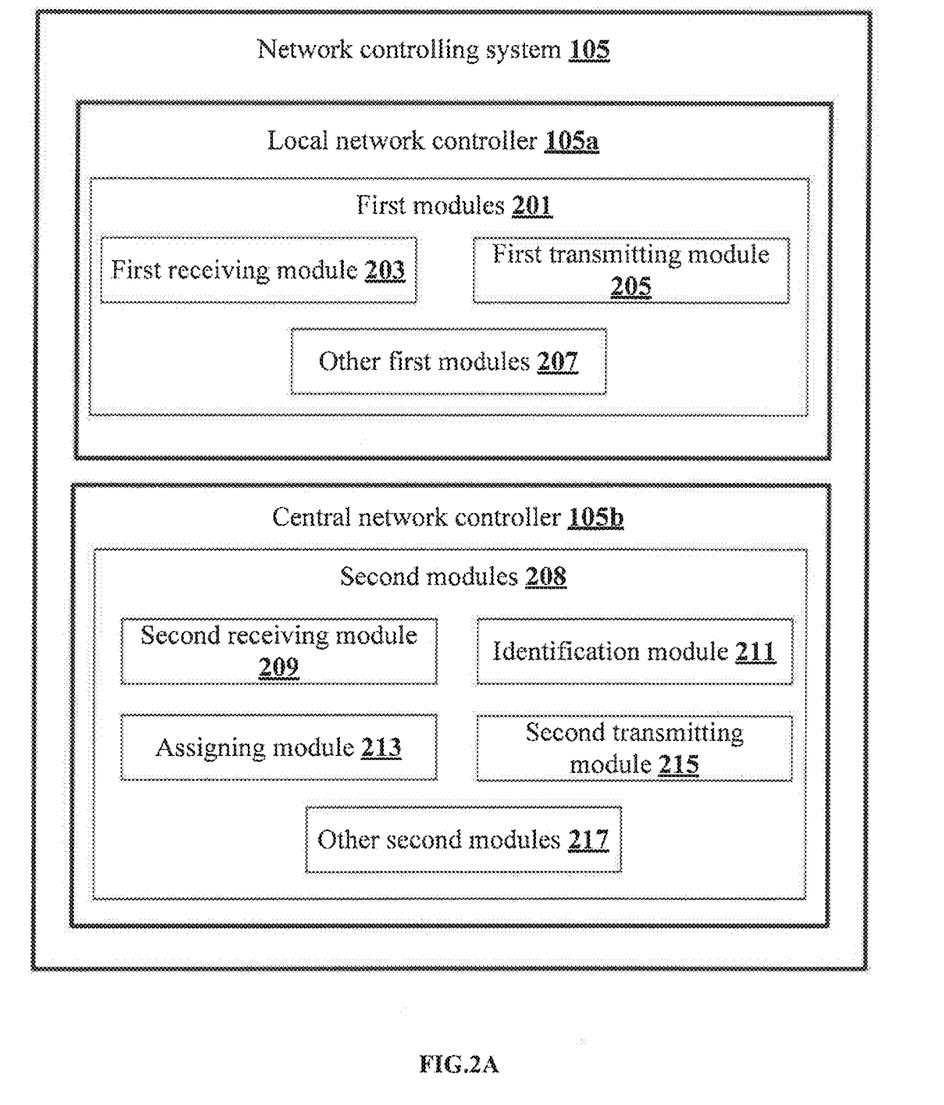
FIG. 2A shows a block diagram illustrating a network controlling system for connecting network entities in a broadband communication network without Circuit-Switched (CS) fallback in accordance with one or more embodiments of the present disclosure.

FIG. 2A shows a block diagram illustrating a network controlling system for connecting network entities in a broadband communication network without Circuit-Switched (CS) fallback in accordance with one or more embodiments of the present disclosure.

In some implementation, the network controlling system 105 comprises a local network controller 105a and a central network controller 105b. The local network controller 105a comprises one or more functionalities of the central network controller 105b. The local network controller 105a may include, but not limited to, first modules 201 such as a first receiving module 203, a first transmitting module 205 and other first modules 207. The other first modules 207 may be used to perform various miscellaneous functionalities of the local network controller 105a. In some embodiment, when the source intermediate network entity 104 and the destination intermediate network entity 109 are from different vendors, the other first modules 207 may perform one or more functionalities of the central network controller 105b. The one or more functionalities ensure interoperability between when the source intermediate network entity 104 and the destination intermediate network entity 109 are from different vendors. Ensuring interoperability thereby, reduces delay in establishing at least one of the voice connection or the data connection between the primary network entity 101 and the secondary network entity 110. It will be appreciated that such aforementioned first modules 201 may be represented as a single module or a combination of different modules.

In some embodiment, the first receiving module 203 receives a Radio Resource Control (RRC) request from a primary network entity 101 through the source intermediate network entity 104 to establish at least one of a voice connection or a data connection with a secondary network entity 110. In some embodiment, the first receiving module 203 receives the RRC request via S1-AP interface. Further, the first receiving module 203 receives at least one of valid International Mobile Subscriber Identity (IMSI), phone number and global unique Identifier (ID) along with the RRC request to establish at least one of the voice connection or the data connection.

In some embodiment, the first transmitting module 205 transmits the RRC request to the central network controller 105b. In some embodiment, the first transmitting module 205 transmits the RRC request via S10 interface.

The central network controller 105b may include, but not limited to, second modules 208 such as a second receiving module 209, an identification module 211, an assigning module 213 and a second transmitting module 215 and other second modules 217. The other second modules 217 may be used to perform various miscellaneous functionalities of the central network controller 105b. It will be appreciated that such aforementioned second modules 208 may be represented as a single module or a combination of different modules.

In some embodiment, the second receiving module 209 receives the RRC request from the local network controller 105a.

In some embodiment, the identification module 211 identifies a destination intermediate network entity 109 associated with the secondary network entity 110. As an example, the destination intermediate network entity 109 may be one or more eNodeB. Further, the identification module 211 identifies a broadband communication network 103 corresponding to the destination intermediate network entity 109.

In some embodiment, the assigning module 213 assigns an Internet Protocol (IP) address to the primary network entity 101 if the destination intermediate network entity 109 is present in the same broadband communication network 103 as the source intermediate network entity 104. Upon assigning the IP address, a traffic engineered tunnel 107 is established between the source intermediate network entity 104 and the destination intermediate network entity 109. The traffic engineered tunnel 107 between the source intermediate network entity 104 and the destination intermediate network entity 109 in turn establishes at least one of the voice connection or the data connection between the primary network entity 101 and the secondary network entity 110. Upon establishing at least one of the voice connection or the data connection, the primary network entity 101 and the secondary network entity 110 exchange bits. As an example, the bits can be voice, data, telex, telemetry etc. The traffic engineered tunnel 107 provides guaranteed bit rate for the voice calls. On the other hand, the traffic engineered tunnel 107 provides best effort or average bit rate for the data connection.

In some embodiment, the second transmitting module 215 transmits the RRC request to a remote anchoring gateway 113 if the destination intermediate network entity 109 is not present in the same broadband communication network 103 as the source intermediate network entity 104. The remote anchoring gateway 113 assigns the IP address to the primary network entity 101 and establishes at least one of the voice connection or the data connection between the primary network entity 101 and the secondary network entity 110.

In some embodiment, the primary network entity 101 and the secondary network entity 110 may be connected to the same intermediate network entity i.e. the source intermediate network entity 104 and the destination intermediate network entity 109 may be the same. The network controlling system 105 performs local rerouting at Physical (PHY) layer, Media Access Control (MAC) layer and IP layer for establishing at least one of the voice connection or the data connection if the source intermediate network entity 104 and the destination intermediate network entity 109 are the same. At the PHY layer, the intermediate network entity will map incoming frequency-time grid resource to outgoing frequency-time grid resource of a resource block. At the MAC layer, the intermediate network entity will perform MAC forwarding and then the PHY layer of the intermediate network entity will additionally perform resource block mapping. At the IP layer, the intermediate network entity will perform IP routing and then MAC forwarding followed by additional. PHY layer resource-block mapping.

In an example, the first modules 201 and the second modules 208 may be implemented as hardware. As used herein, the term module may refer to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2B:
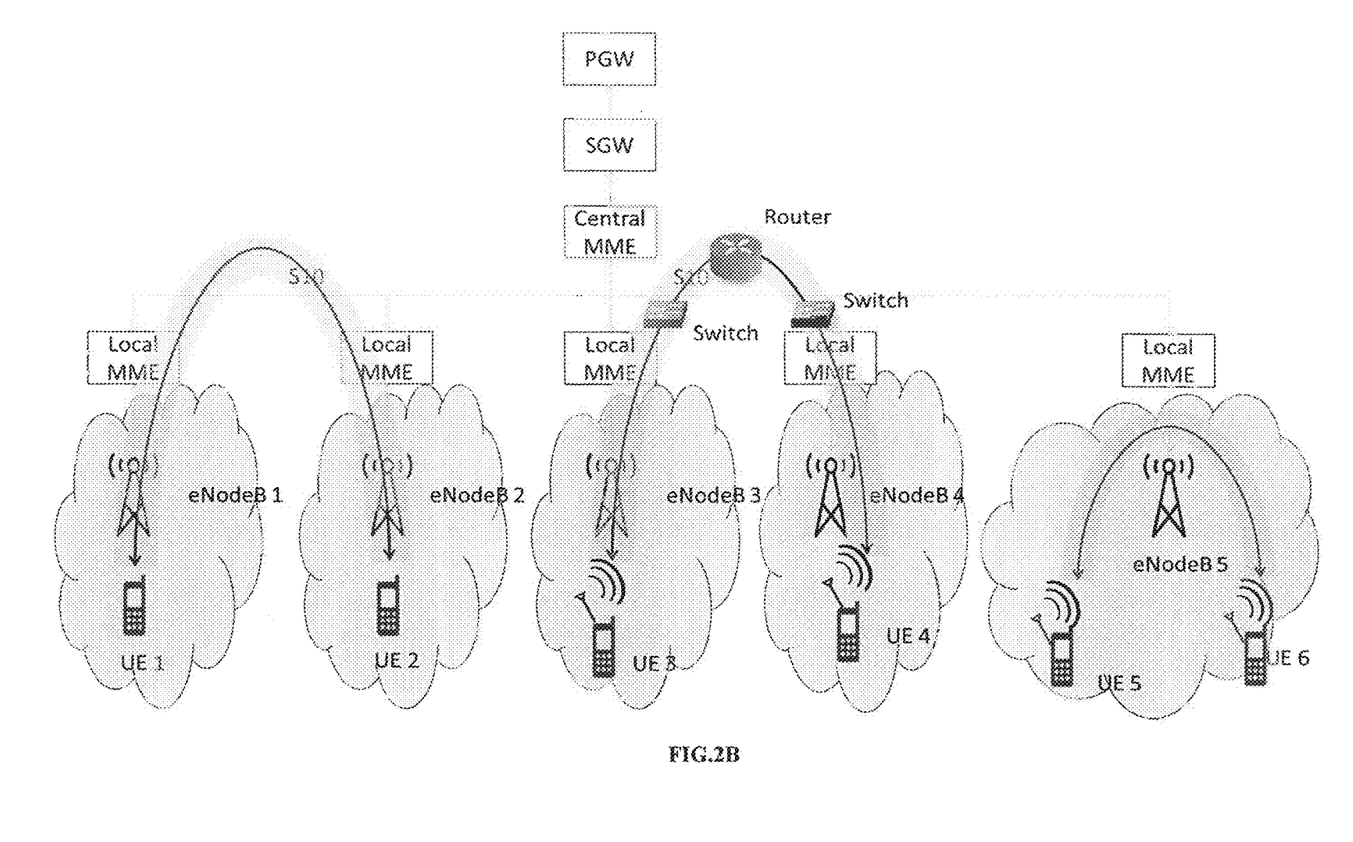
FIG. 2B shows an exemplary illustration of the method for connecting network entities in a broadband communication network without Circuit-Switched (CS) fallback in accordance with some embodiments of the present disclosure.

Consider a scenario as shown in FIG. 2B, illustrating at least one of the voice connection or the data connection between the primary network entity 101 and the secondary network entity 110. In FIG. 2B, the primary network entity 101 and secondary network entity 110 are User Equipment (UE) such as a mobile phone. Consider the UEs, UE 1 and UE 2. In this example, the primary network entity 101 is represented as the UE 1 and the secondary network entity 110 is represented as the UE 2. Also, in this example, the source intermediate network entity 104 and the destination intermediate network entity 109 are eNodeBs. eNodeB 1 represents the source intermediate network entity 104 and eNodeB 2 represents the destination intermediate network entity 109. Further, the network controller is a Mobility Management Entity (MME). The local network controller 105a is represented as local MME and the central network controller 105b is represented as central MME. UE 1 sends the request to the eNodeB 1 to establish at least one of the voice connection or the data connection with the UE 2. The UE 1 uses at least one of the IMSI, phone number and the global unique ID of the UE 2 to establish at least one of the voice connection or the data connection with the UE 2. The eNodeB 1 forwards the request to the local MME associated with the UE 1 to establish the voice calls/data connection. Further, the local MME associated with the UE 1 forwards the request to the central MME. Upon receiving the request, the central MME identifies the eNodeB 2. Since the eNodeB 2 is present in the same broadband communication network 103 as the eNodeB 1, the central MME assigns an Internet Protocol (IP) address and establishes a traffic engineered tunnel 107 between the eNodeB 1 and the eNodeB 2. The traffic engineered tunnel 107 between the eNodeB 1 and the eNodeB 2 in turn establishes at least one of the voice connection or the data connection between the UE 1 and the UE 2. The eNodeB 1 maps frame or packet of bits from UE 1 received over the radio link onto the traffic engineered tunnel 107 and vice-versa. eNodeB 2 performs similar mapping of frame or packet of bits.

Similarly, at least one of the voice connection or the data connection is established between UE 3 and UE 4 as shown in the FIG. 2B.

Further, consider another scenario as shown in FIG. 2B illustrating at least one of the voice connection or the data connection between the UEs connected to the same eNodeB. Consider the UEs, UE 5 and UE 6. The UE 5 sends the RRC request to the source intermediate network entity 104 which is represented as eNodeB 5, to establish at least one of the voice connection or the data connection with the UE 6. The UE 5 uses at least one of the IMSI, phone number and the global unique ID of the UE 6 to establish the voice calls/data connection with the UE 6. The eNodeB 5 forwards the request to the local MME to establish the voice calls/data connection. Further, the local MME forwards the request to the central MME. Upon receiving the request, the central MME identifies the destination intermediate network entity 109 of the UE 6 which is represented in this example as eNodeB 5. Since the eNodeB 5 is common to both the UE 5 and the UE 6, the eNodeB 5 performs local rerouting at the PHY layer, the MAC layer and the IP layer.

Figure 3:
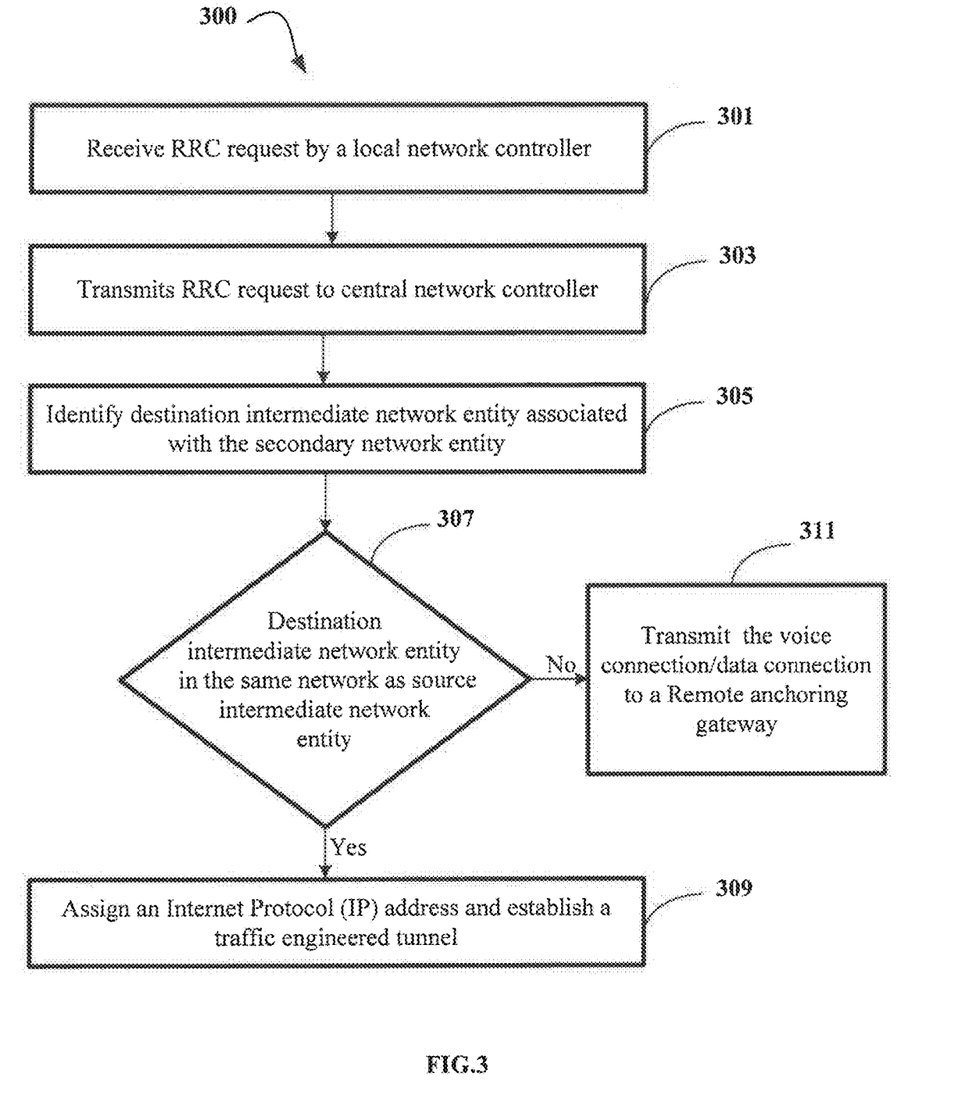
FIG. 3 illustrates a flowchart showing a method for connecting network entities in a broadband communication network without Circuit-Switched (CS) fallback in accordance with some embodiments of the present disclosure.

FIG. 3 illustrates a flowchart showing a method for connecting network entities in a broadband communication network without Circuit-Switched (CS) fallback in accordance with some embodiments of the present disclosure.

As illustrated in FIG. 3, the method 300 comprises one or more blocks illustrating a method for connecting network entities in a broadband communication network without Circuit-Switched (CS) fallback. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, a local network controller 105a receives a Radio Resource Control (RRC) request. In some embodiment, the local network controller 105a receives the RRC request through a source intermediate network entity 104 to establish at least one of the voice connection or the data connection with secondary network entity 110 via S1-AP interface. In some embodiment, the source intermediate network entity 104 receives the RRC request from a primary network entity 101 which requests to establish the voice calls/data connection with the secondary network entity 110 using at least one of valid International Mobile Subscriber Identity (IMSI), phone number and global unique Identifier (ID).

At block 303, the local network controller 105a transmits the RRC request to a central network controller 105b to establish at least one of the voice connection or the data connection using S10 interface.

At block 305, the central network controller 105b identifies a destination intermediate network entity 109 of the secondary network entity 110. Further, the central network controller 105b also identifies a broadband communication network 103 of the destination intermediate network entity 109 of the secondary network entity 110.

At block 307, a condition is checked to see whether the destination intermediate network entity 109 is in the same broadband communication network 103 as the source intermediate network entity 104. If the destination intermediate network entity 109 is present in the broadband communication network 103 as the source intermediate network entity 104, then the method proceeds to block 309 via "Yes". If the destination intermediate network entity 109 is not present in the same broadband communication network 103 as the source intermediate network entity 104, then the method proceeds to block 311 via "No".

At block 309, the central network controller 105b assigns an Internet Protocol (IP) address and establishes a traffic engineered tunnel 107. In some embodiment, the traffic engineered tunnel 107 is established between the source intermediate network entity 104 and the destination intermediate network entity 109 which in turn establish at least one of the voice connection or the data connection between the primary network entity 101 and the secondary network entity 110.

At block 311, the central network controller 105b transmits the RRC request to a remote anchoring gateway 113.

Advantages of the Present Disclosure

The present disclosure provides a system and a method for connecting network entities in a broadband communication network without Circuit-Switched (CS) fallback.

The present disclosure provides a feature wherein, the central network controller assigns an Internet Protocol (IP) address and establishes a traffic engineered tunnel between the source intermediate network entities and the destination intermediate network entities, if the destination intermediate network entities are present in the same network as the source intermediate network entities.

The traffic engineered tunnel between the source intermediate network entities and the destination eNodeB in turn establishes the voice calls/data connection between the primary network entities and the secondary network entities without the interference of remote anchoring gateway. Therefore, load on the remote anchoring gateway decreases, thus reducing the delay in connection establishment and possibility of congestion at the remote anchoring gateway.

The present disclosure provides a feature wherein the traffic engineered tunnel provides guaranteed bit rate for the voice connections and best effort or average bit rate for the data connections.

The present disclosure provides a feature wherein one or more functionalities of a central network controller and remote anchoring gateways are placed in the local network controller. The one or more functionalities speed up processing or reduce delay since involvement of the central network controller is not required all the time. Further, the one or more functionalities enable scalability and take load off the central network controller.

The present disclosure provides a method wherein CS fall back is not required which in turn reduces cost of the network entities and the broadband communication network.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a system and a method for connecting network entities in a broadband communication network without Circuit Switched (CS) fallback. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
|---|---|
| 100 | Architecture |
| 101 | Primary network entity |
| 103 | Broadband communication network |
| 104 | Source intermediate network entities |
| 105 | Network controlling system |
| 105a | Local network controller |
| 105b | Central network controller |
| 107 | Traffic engineered tunnel |
| 109 | Destination intermediate network entity |
| 110 | Secondary network entity |
| 113 | Remote anchoring Gateway |
| 201 | First modules |
| 203 | First receiving module |
| 205 | First transmitting module |
| 207 | Other first modules |
| 208 | Second modules |
| 209 | Second receiving module |
| 211 | Identification module |
| 213 | Assigning module |
| 215 | Second transmitting module |
| 217 | Other second modules |

We claim:

1. A network controlling system for connecting network entities in a broadband communication network without Circuit-Switched (CS) fallback, the network controlling system comprising:
    a local network controller configured to:
        receive a Radio Resource Control (RRC) request from a source intermediate network entity for initiating at least one of a voice connection or a data connection with a secondary network entity, wherein the source intermediate network entity receives the RRC request from a primary network entity, and
        transmit the RRC request to a central network controller; and
    the central network controller configured to:
        receive the RRC request from the local network controller;
        identify a destination intermediate network entity associated with the secondary network entity based on the RRC request;
        identify a broadband communication network corresponding to the destination intermediate network entity; and
        in response to the source intermediate network entity and the destination intermediate network entity being present in an identical broadband communication network, assign an Internet Protocol (IP) address and establish a traffic engineered tunnel between the source intermediate network entity and the destination intermediate network entity, such that at least one of the voice connection or the data connection is established without an occurrence of CS fallback.

2. The network controlling system as claimed in claim 1, wherein the central network controller is further configured to transmit the RRC request to remote anchoring gateways for establishing at least one of the voice connection or the data connection, if the source intermediate network entity and the destination intermediate network entity are not present in the same broadband communication network.

3. The network controlling system as claimed in claim 1, wherein the local network controller comprises one or more functionalities of the central network controller and the remote anchoring gateways for connecting the network entities in the broadband communication network without the CS fallback.

4. The network controlling system as claimed in claim 1 is further configured to locally reroute at Physical (PHY) layer, Media Access Control (MAC) layer and IP layer for establishing at least one of the voice connection or the data connection if the source intermediate network entity and the destination intermediate network entity are same.

5. The network controlling system as claimed in claim 1, wherein the traffic engineered tunnel enables the primary network entity and the secondary network entity to exchange bits.

6. The network controlling system as claimed in claim 5, wherein the bits are related to at least one of voice, data, telex and telemetry.

7. The network controlling system as claimed in claim 1, wherein the network entities comprise at least one of a set of NodeB, a set of Evolved NodeB (eNodeB), a set of Base Transceiver Stations (BTS), a set of Customer Premises Equipment (CPE), a set of packet aggregators, a set of frame processing devices, a set of packet processing devices, a set of signal processing devices, a User Equipment (UE) and a set of computers.

8. A method for connecting network entities in a broadband communication network without Circuit-Switched (CS) fallback, the method comprising:
    receiving, by a local network controller configured in the network controlling system, a Radio Resource Control (RRC) request from a source intermediate network entity for initiating at least one of a voice connection or a data connection with a secondary network entity, wherein the source intermediate network entity receives the RRC request from a primary network entity;
    transmitting, by the local network controller, the RRC request to a central network controller;
    receiving, by the central network controller configured in the network controlling system, the RRC request from the local network controller;
    identifying, by the central network controller, a destination intermediate network entity associated with the secondary network entity based on the RRC request;
    identifying, by the central network controller, a broadband communication network corresponding to the destination intermediate network entity; and
    in response to the source intermediate network entity and the destination intermediate network entity being present in an identical broadband communication network assigning, by the central network controller, an Internet Protocol (IP) address and establishing a traffic engineered tunnel between the source intermediate network entity and the destination intermediate network entity, such that at least one of the voice connection or the data connection is established without an occurrence of CS fallback.

9. The method as claimed in claim 8 further comprises transmitting, by the central network controller, the RRC request to remote anchoring gateways for establishing at least one of the voice connection or the data connection, if the source intermediate network entity and the destination intermediate network entity are not present in the same broadband communication network.

10. The method as claimed in claim 8, wherein the local network controller comprises one or more functionalities of the central network controller and the remote anchoring gateways for connecting the network entities in the broadband communication network without the CS fallback.

11. The method as claimed in claim 8, wherein a local reroute occurs at Physical (PHY) layer, Media Access Control (MAC) layer and IP layer for establishing at least one of the voice connection or the data connection when the source intermediate network entity and the destination intermediate network entity are same.

12. The method as claimed in claim 8, wherein the traffic engineered tunnel enables the primary network entity and the secondary network entity to exchange bits.

13. The method as claimed in claim 12, wherein the bits are related to at least one of voice, data, telex and telemetry.

14. The method as claimed in claim 8, wherein the network entities comprise at least one of a set of NodeB, a set of Evolved NodeB (eNodeB), a set of Base Transceiver Stations (BTS), a set of Customer Premises Equipment (CPE), a set of packet aggregators, a set of frame processing devices, a set of packet processing devices, a set of signal processing devices, a User Equipment (UE) and a set of computers.

15. The method as claimed in claim 9, wherein the local network controller comprises one or more functionalities of the central network controller and the remote anchoring gateways for connecting the network entities in the broadband communication network without the CS fallback.

\* \* \* \* \*